(12) United States Patent
Hahn et al.

(10) Patent No.: US 11,348,608 B2
(45) Date of Patent: May 31, 2022

(54) TRI-STAGE DESIGN FOR ACTUATOR ATTACHMENT ON FLEXURE

(71) Applicant: Magnecomp Corporation, Murrieta, CA (US)

(72) Inventors: Peter Hahn, Bangkok (TH); David Glaess, Bangkok (TH); Kuen Chee Ee, Chino, CA (US); Benjapa Tanampee, Ayutthaya (TH); Keith Allan Vanderlee, Midland, TX (US); Preecha Sudachun, Wangnoi (TH); Johnathan Phu, Wangnoi (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 17/165,749

(22) Filed: Feb. 2, 2021

(65) Prior Publication Data

US 2021/0249040 A1    Aug. 12, 2021

Related U.S. Application Data

(60) Provisional application No. 62/971,099, filed on Feb. 6, 2020.

(51) Int. Cl.
    *G11B 5/48*    (2006.01)

(52) U.S. Cl.
    CPC ............ *G11B 5/486* (2013.01); *G11B 5/4813* (2013.01); *G11B 5/4826* (2013.01); *G11B 5/4833* (2013.01)

(58) Field of Classification Search
    CPC ...... G11B 5/486; G11B 5/4826; G11B 5/4813; G11B 5/4833
    See application file for complete search history.

(56) References Cited

U.S. PATENT DOCUMENTS

| | | | |
|---|---|---|---|
| 7,403,357 B1* | 7/2008 | Williams | G11B 5/4853 360/245.9 |
| 8,934,203 B2* | 1/2015 | Hanya | G11B 5/4813 360/294.4 |
| 9,111,559 B1* | 8/2015 | Hahn | G11B 5/4873 |
| 9,135,936 B1* | 9/2015 | Hahn | G11B 5/39 |
| 9,224,410 B1* | 12/2015 | Ee | G11B 5/483 |
| 9,251,817 B1* | 2/2016 | Hahn | G11B 5/483 |
| 9,311,938 B1* | 4/2016 | Ee | G11B 5/48 |
| 9,892,748 B1* | 2/2018 | Ee | G11B 5/4826 |
| 2004/0125508 A1 | 7/2004 | Yang et al. | |
| 2010/0073825 A1* | 3/2010 | Okawara | G11B 5/5552 360/294.4 |

(Continued)

OTHER PUBLICATIONS

International Search Report and Written Opinion in International Application No. PCT/US2021/016447, dated Jul. 23, 2021.

*Primary Examiner* — Brian E Miller
(74) *Attorney, Agent, or Firm* — DLA Piper LLP (US)

(57) ABSTRACT

A method of manufacturing a tri-stage assembly is described herein. The method includes attaching a first microactuator and a second microactuator to a trace gimbal to a flexure during a PZT on flexure process (POF). The first microactuator is located at a distal end of the flexure and the second microactuator located at a proximal end of the flexure. The method also includes welding the trace gimbal to a baseplate, and a load beam to secure the trace gimbal including the first microactuator and the second microactuator.

18 Claims, 5 Drawing Sheets

(56) References Cited

U.S. PATENT DOCUMENTS

| | | | |
|---|---|---|---|
| 2011/0096438 A1* | 4/2011 | Takada | G11B 5/4853 360/244.2 |
| 2011/0141624 A1* | 6/2011 | Fuchino | G11B 5/4873 360/244.2 |
| 2011/0149440 A1* | 6/2011 | Uematsu | G11B 5/4873 360/245.3 |
| 2011/0299197 A1 | 12/2011 | Eguchi | |
| 2013/0107397 A1* | 5/2013 | McCaslin | G11B 5/4833 360/244.2 |
| 2014/0022671 A1* | 1/2014 | Takikawa | G11B 5/4826 360/234.6 |
| 2014/0085755 A1* | 3/2014 | Hanya | G11B 5/4853 360/244.5 |
| 2014/0139953 A1 | 5/2014 | Hatch | |
| 2014/0168815 A1* | 6/2014 | Kudo | G11B 5/4873 360/99.08 |
| 2015/0138739 A1* | 5/2015 | Hishiki | H05K 3/305 361/760 |
| 2016/0035968 A1 | 2/2016 | Sakakura et al. | |
| 2016/0086625 A1* | 3/2016 | Berscheit | G11B 5/483 360/294.4 |
| 2016/0267929 A1 | 9/2016 | Someya et al. | |
| 2018/0033948 A1* | 2/2018 | Ee | G11B 5/4873 |
| 2018/0040343 A1* | 2/2018 | Ee | G11B 5/4873 |
| 2019/0228796 A1* | 7/2019 | Ee | H01L 41/0933 |
| 2019/0295574 A1 | 9/2019 | Hahn et al. | |
| 2020/0286511 A1* | 9/2020 | Nesori | H01L 41/0475 |
| 2021/0249040 A1* | 8/2021 | Hahn | G11B 5/4826 |

\* cited by examiner

TRI-STAGE DESIGN FOR ACTUATOR ATTACHMENT ON FLEXURE

CROSS-REFERENCE TO RELATED APPLICATIONS

This application claims the benefit of U. S. Provisional Application No. 62/971,099 filed on Feb. 6, 2020, which is hereby incorporated by reference in its entirety.

FIELD

Embodiments of the invention relate generally to an improved process of mounting an actuator to a suspension.

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates.

Increasing areal density (a measure of the quantity of information bits that can be stored on a given area of disk surface) has led to the necessary development and implementation of secondary and even tertiary actuators for improved head positioning through relatively fine positioning, in addition to a primary voice coil motor (VCM) actuator which provides relatively coarse positioning. Some hard disk drives employ micro- or milli-actuator designs to provide second and/or third stage actuation of the recording head to enable more accurate positioning of the head relative to the recording track. Milli-actuators are broadly classified as actuators that move the entire front end of the suspension: spring, load beam, flexure and slider, and are typically used as second stage actuators. Microactuators are typically used as third stage actuators and are broadly classified as actuators that move only the slider, moving it relative to the suspension and load beam, or move only the read-write element relative to the slider body. A third stage actuator is used in conjunction with a first stage actuator (e.g., VCM) and a second stage actuator (e.g., milli-actuator) for more accurate head positioning.

There remains a continuing need for improved suspensions. Suspensions with enhanced performance capabilities are desired. The suspensions should be capable of being efficiently manufactured.

SUMMARY

A method of manufacturing a tri-stage assembly is provided. The method includes attaching a first actuator (for example a mPZT) and a second actuator (for example an uPZT) to a trace gimbal during a PZT on flexure process (POF). The mPZT is located proximal to the uPZT. The method also includes welding a baseplate, load beam and trace gimbal together, before moving on to subsequent suspension manufacturing processes including, but not limited to, attaching damper material and other process techniques.

In some implementations, the baseplate is made up of stainless-steel. Furthermore, the mPZT and uPZT microactuators can be operable in a transverse, shear or bending mode. The uPZT can be located at a gimbal head of the trace gimbal. Furthermore, the mPZT can be located opposite the gimbal head of the trace gimbal at a load beam area.

The method can also include welding a shelf with a fold feature to the trace gimbal before attaching the mPZT and the uPZT to the trace gimbal. In some implementations, the fold feature is positioned 80 degrees with respect to the load beam.

A tri-stage assembly is also provided. The tri-stage assembly includes a microactuator including a proximal end and a distal end. The tri-stage assembly can also include a first electrode attached to a top surface of the microactuator and a second electrode attached to a base surface of the microactuator. The tri-stage assembly can also include a first electrically conductive adhesive contacting at least a portion of the first electrode at the proximal end to connect the first electrode to a trace gimbal, and a second electrically conductive adhesive contacting at least a portion of the second electrode to connect the second electrode to the trace gimbal.

The tri-stage assembly can also include a first non-conductive adhesive contacting at least a portion of the second electrode and the microactuator at the proximal end to secure the microactuator to a trace gimbal. A second non-conductive adhesive can also be included to contact at least a portion of the second electrode at the distal end. The tri-stage assembly can also include a shelf feature on the trace gimbal configured to connect to the second non-conductive adhesive.

In some implementations, the second electrically conductive adhesive is located at the distal end to connect the second electrode to the trace gimbal. In other implementations, the second electrically conductive adhesive can be located between the proximal end and the distal end to connect the second electrode to the trace gimbal.

Other features and advantages of implementations of the present invention will be apparent from the accompanying drawings and from the detailed description that follows.

BRIEF DESCRIPTION OF THE DRAWINGS

Implementations of the present invention are illustrated, by way of example and not limitation, in the figures of the accompanying drawings, in which like references indicate similar elements and in which.

DETAILED DESCRIPTION

A preferred implementation of the disclosed suspension structure and manufacturing process that enables direct attachment between a first microactuator and the trace gimbal. After the mounting, the trace gimbal is welded to the mount plate, securing the first microactuator. As a result, the process does not require unnecessary adhesive dispensing to secure the first microactuator to the baseplate. Adhesives create potential contamination issues within the disk drive suspension clean room assembly environment. As a result, minimizing the use of adhesives helps to decrease manufacturing complexity and cost, and to increase the reliability of the disk drive assembly.

Figure 1:
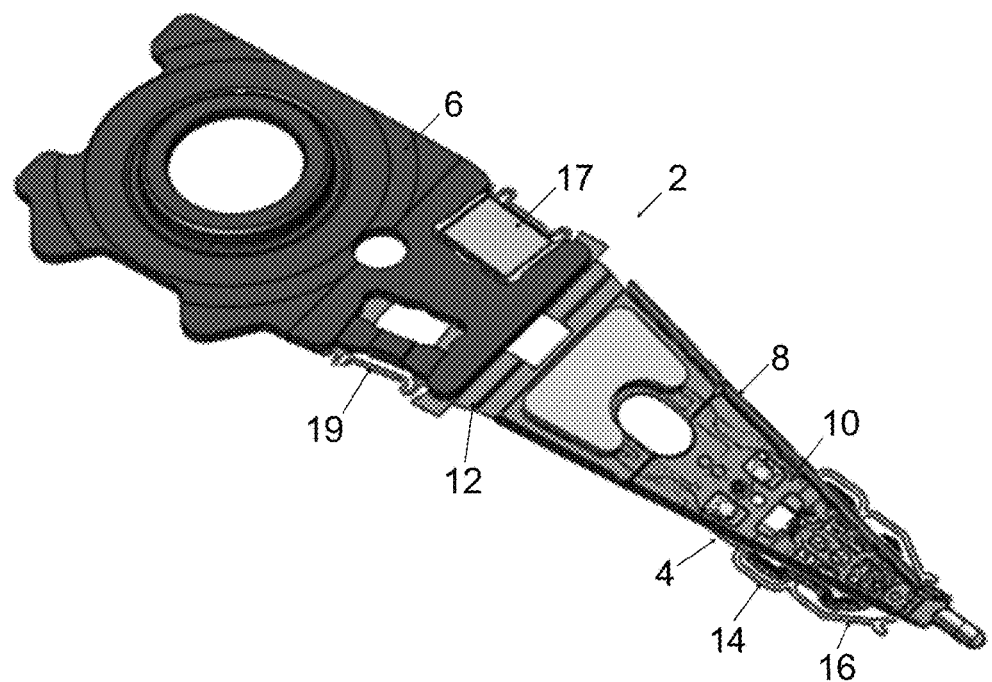
FIG. 1 is a perspective view of a suspension having a flexure with a tri-stage actuation structure according to an implementation.
Figure 2:
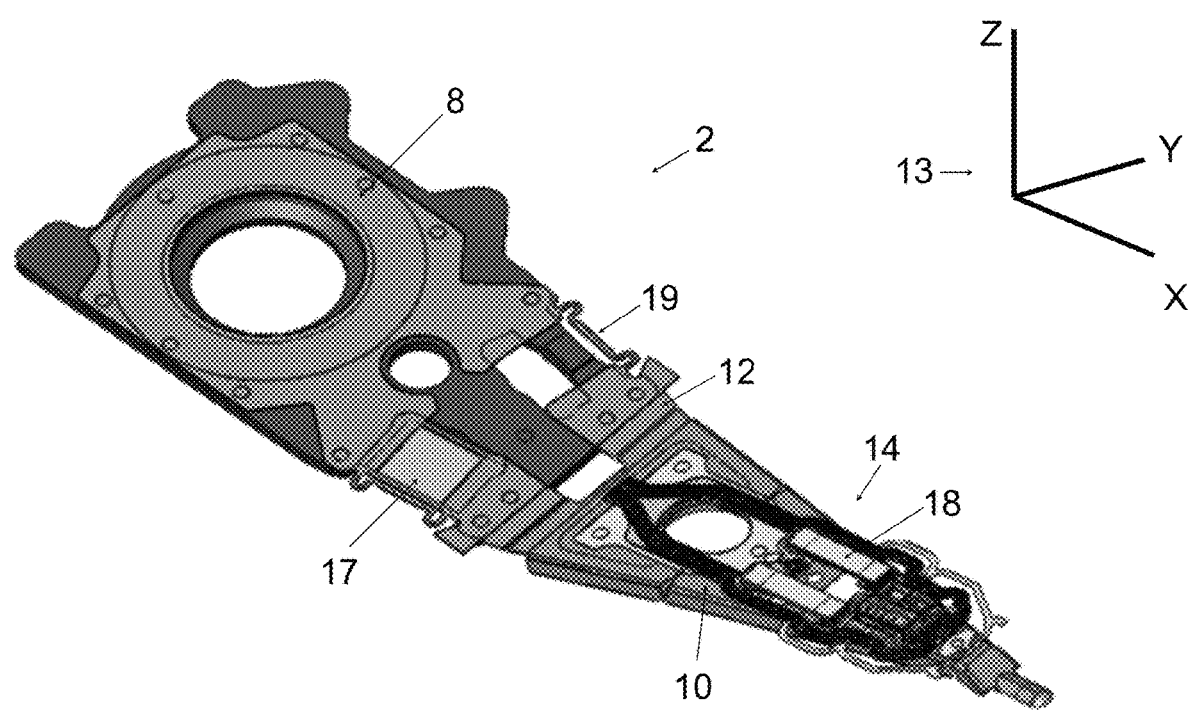
FIG. 2 is a perspective view of the underside of the tri-stage actuation structure of FIG. 1.

FIG. 1 is a perspective view of in which a suspension 2 with a co-located or gimbal-based actuation structure 16. FIG. 2 is a perspective view of an underside of the suspension 2. The suspension 2 can include a flexure 4 and a baseplate 6. The baseplate 6 can be configured as a proximal mounting structure. The suspension 2 can also include a load beam 8 having a rigid or beam region 10. The beam region 10 can be coupled to the baseplate 6 along a spring or hinge region 12. The load beam 8 can be formed from stainless steel.

The flexure 4 can include a trace gimbal 14 at the distal end of the flexure 4. An actuation structure 16 can be located on the trace gimbal 14, adjacent to the distal end of the load beam 8. For the purposes of illustration, the terms proximal and distal refer to the relative direction along the longitudinal axis of the suspension 2. For example, the baseplate 6 is proximal of the load beam 8. An axes key 13 indicates X, Y, and Z axes in FIGS. 1 and 2. The suspension 2 is generally elongated along the X axis in distal and proximal directions. The Y axis represents lateral left and right directions. The suspension 2, including the flexure 4, are generally co-planar with an X-Y plane defined by the X and Y axes. The Z axis represents height as well as bottom and top orientations.

The suspension 2 can also include a first microactuator 17 (for example a mPZT). The first microactuator 17 can be mounted on the baseplate 6 and configured to move the load beam 8. Expansion and contraction of the first microactuator 17 moves the load beam 8 of the suspension 2, and more specifically, rotates the entire load beam 8. The baseplate 6 can include a pseudo feature 19 and be configured to receive and secure the first microactuator 17. Specifically, the pseudo feature 19 balances out the mass, mass distribution, and stiffness of the first microactuator 17. Pseudo feature 19 could be manufactured separately and then affixed to baseplate 6 such as by laser welding or by adhesive. Pseudo feature 19 could also be partly or wholly manufactured integrally with baseplate 6. Because baseplate 6 is typically made from stainless steel (SST), pseudo feature could be unitarily formed with baseplate 6 from a single piece of stainless steel. Etching or laser ablation could create areas of greater and lesser thickness and width within pseudo feature 19. Furthermore, laser treatment could locally alter the mechanical properties of the stainless steel within pseudo feature 19, such as creating locally softer areas, to help fine tune the properties of pseudo feature 19.

The first microactuator 17 is fixed to the baseplate 6 using non-conductive adhesive. For example, non-conductive adhesive such as epoxy affix can be applied to mount the first microactuator 17, and conductive adhesive can be applied to electrically bridge a copper pad to the top surface of the first microactuator 17, which defines the driving voltage electrode of that microactuator. A second microactuator or a microactuator pair, for example a constraining layer construction microactuator(s) (CLC PZT), can be mounted to the trace gimbal 14 at a receiving space 18. The microactuator pair on opposite lateral sides of the trace gimbal 14 act in push-pull fashion on the gimbal to rotate a head slider. The head slider contains a magnetic read transducer and a magnetic write transducer in order to respectively read data from, and write data to, the disk drive platter. The first microactuator 17 can be configured to make coarse movements due to its mounted location between the baseplate 6 and load beam 8 (m-stage). The second microactuator can be configured to make fine adjustments due to its mounted location on the flexure 4 (u-stage).

Figure 3:
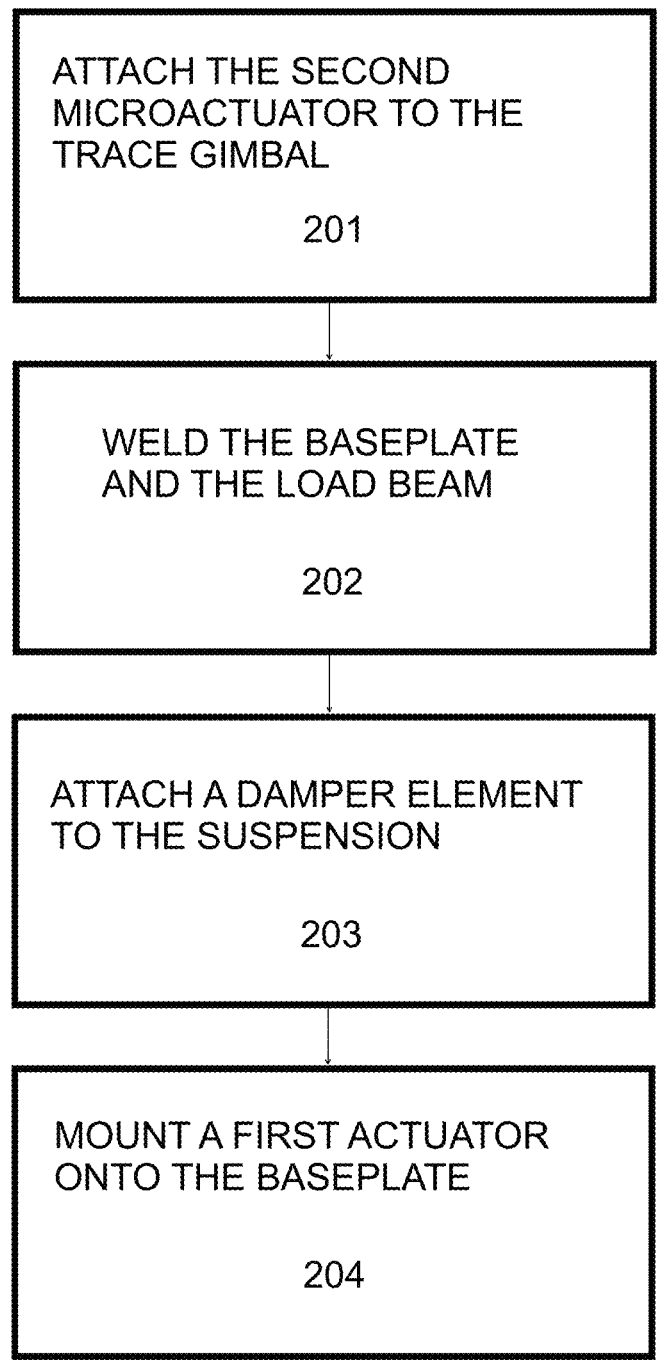
FIG. 3 is a flow chart describing a process according to an implementation for manufacturing a tri-stage actuation structure.

FIG. 3 depicts an exemplary flow chart describing a process 200 for manufacturing the suspension 2 of FIGS. 1 and 2. The process 200 is described in detail with reference to the components of the suspension 2 of FIGS. 1 and 2. As an initial matter, the second microactuator is attached to the trace gimbal 14 at the receiving space 18 at step 201. Specifically, areas of adhesive such as epoxy affix can be applied to the receiving space 18, while conductive adhesive is applied to electrically bridge a copper pad to the top surface of second microactuator which defines the driving voltage electrode of that microactuator. At step 202, the baseplate 6, the load beam 8 and the trace gimbal 14 are welded together. A damping material is attached to the suspension 2 at step 203. For example, damping material is viscoelastic damping layers inserted between the second microactuator and the suspension for providing passive damping. The speed of the spindle motor in a high-performance modern hard disk drive is increasing ever to meet the demand. However, the high-speed rotation causes airflows in the drive. It has a considerable effect on the accuracy of head positioning. The viscoelastic layers attached to the suspension suppress the structural resonant modes of suspension excited by the airflows and reduce the transmission of the vibrations from the carriage arm to the suspension excited by the external shocks. Besides, the active control, which comes from the controlled microactuator elements and the VCM, and the passive damping from the viscoelastic layers can both contribute to precision positioning and vibration suppression during track seeking and following.

At step 204, the first microactuator 17 is subsequently mounted on the baseplate 6. Like step 201, areas of adhesive such as epoxy affix are applied to the receiving space for the first microactuator 17, while conductive adhesive is applied to electrically bridge a copper pad to the top surface of first microactuator which defines the driving voltage electrode of that microactuator. As indicated herein, the attachment of the first and second microactuators are carried out in two separate process steps. As a result, the manufacturing process requires excess manufacturing costs and additional adhesive dispensing after the welding process (step 202).

Implementations disclosed herein provide a trace gimbal design that enables mounting of the first microactuator 17 to the flexure 4.

Figure 4:
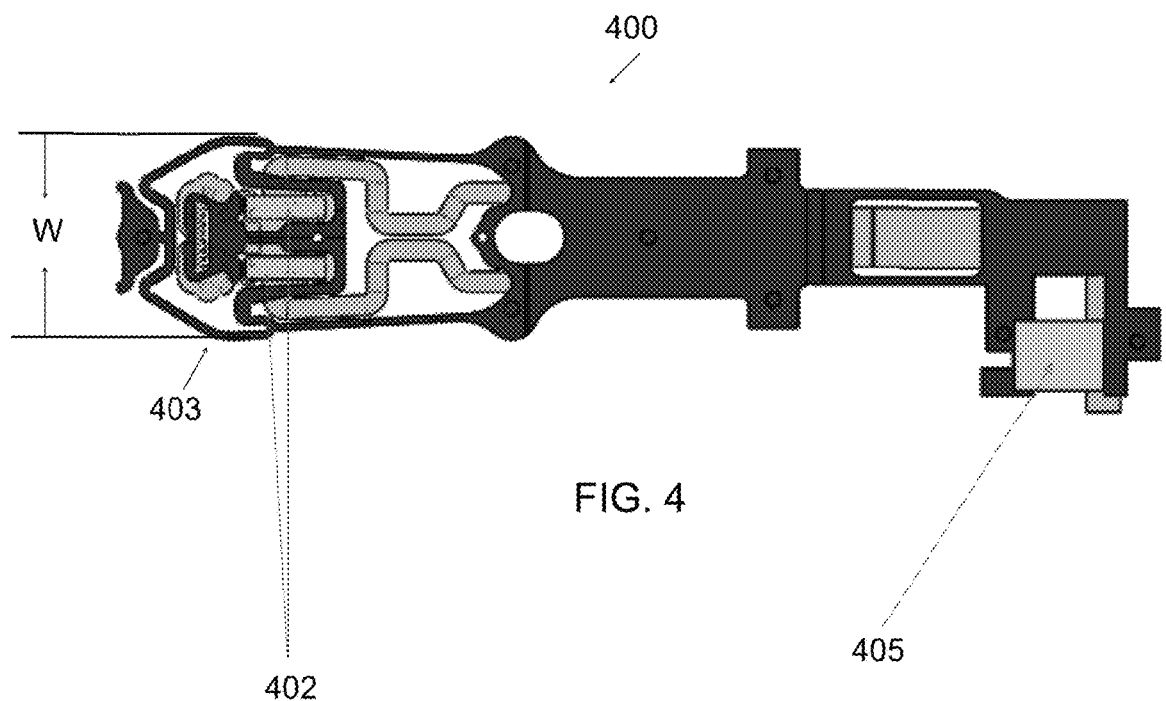
FIG. 4 illustrates an exemplary first trace gimbal design, according to an implementation.

FIG. 4 illustrates an exemplary first trace gimbal 400, according to an implementation. This diagram is merely an example, which should not unduly limit the scope of the claims herein. One of ordinary skill in the art would recognize many other variations, modifications, and alternatives. As shown, the trace gimbal 400 includes a head portion 403. As merely an example, a pair of PZT elements 402 are mounted on the head portion 403 of the gimbal 400. The PZT elements 402 can be mounted on a co-located uDSA flexure design using techniques including those known in the art. The second microactuator or microactuator pair (uPZT) are operable in a transverse, shear or bending mode. During the rotation of the slider, one of the PZT actuating devices increases in length and the other decreases in length, which causes the rotational movement. Of course, there can be many other variations, alternatives, and modifications.

A first microactuator (mPZT) 405 can also be directly mounted to the trace gimbal 400. Once the first, second, and third microactuators are mounted to the trace gimbal 400, the trace gimbal 400 can be welded to a baseplate. As detailed below, the attachment of the microactuator pair (uPZT) and the first microactuator (mPZT) is carried out in one step. Referring specifically to FIG. 4, the overall width W of the trace gimbal 400 is between 1.5 mm and 3 mm. In some examples, the overall width W of the trace gimbal 400 is 2.040 mm. In some implementations, more than one mPZT can be provided with a narrow profile to avoid impact on the panel density. The attachment of the additional mPZT is carried out in the same step as the attachment of the microactuator pair (uPZT) and the first microactuator (mPZT). The configuration of the baseplate can be modified, as well, to account for the trace gimbal 400.

Figure 5:
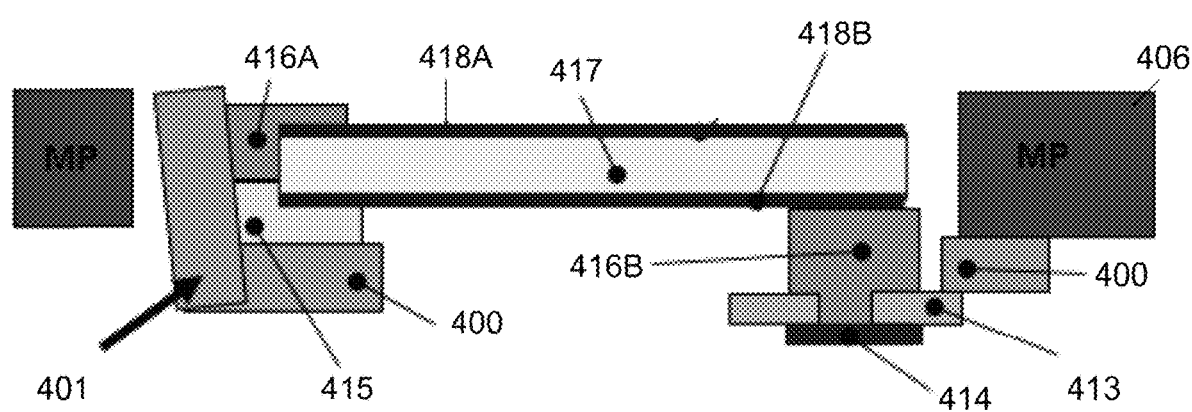
FIG. 5 illustrates a cross-sectional view of the first microactuator mounted to the trace gimbal of FIG. 4, according to an implementation.

FIG. 5 illustrates a cross-sectional view of a microactuator 417 (for example a mPZT) mounted to the trace gimbal 400, according to an implementation. The microactuator 417 can include a proximal end and a distal end. A first electrode 418 can be attached to a top surface of the microactuator 417. Furthermore, a second electrode can be attached to a base surface of the microactuator 417. A first electrically conductive adhesive 416A can be attached to at least a portion of the first electrode 418A at the proximal end. The first electrically conductive adhesive 416A can connect the first electrode 418A to the trace gimbal 400. A second electrically conductive adhesive 416B is configured to contact at least a portion of the second electrode 418B. The second electrically conductive adhesive 416B can connect the second electrode 418B to the trace gimbal 400. Specific to this configuration, the second electrically conductive adhesive 416B is located at the distal end to connect the second electrode 418B to the trace gimbal 400. Other varying implementations are discussed below with respect to FIG. 8.

A first non-conductive adhesive 415 can be configured to contact at least a portion of the second electrode 418B and the microactuator 417 at the proximal end. The first non-conductive adhesive 415 serves to secure the microactuator 417 in place with respect to the trace gimbal 400. The electrically conductive adhesive 416B can be connected to the trace elements: copper 414 and an insulation layer 413, such as a polyimide layer.

In some implementations, the trace gimbal 400 can include a fold feature 401 to enable an electrical connection between the first electrode 418A, the microactuator 417, and the first electrically conductive adhesive 416A. The fold feature 401 can range in its position with respect to the trace gimbal 400. In some implementations, the fold feature 401 can be angled between 60 degrees and 85 degrees (for e.g., at 80 degrees) with respect to the trace gimbal 400. In alternative implementations, the microactuator 417 can be configured such that both the first and second electrodes 418 are accessible, eliminating the need for the fold feature 401.

Figure 6:
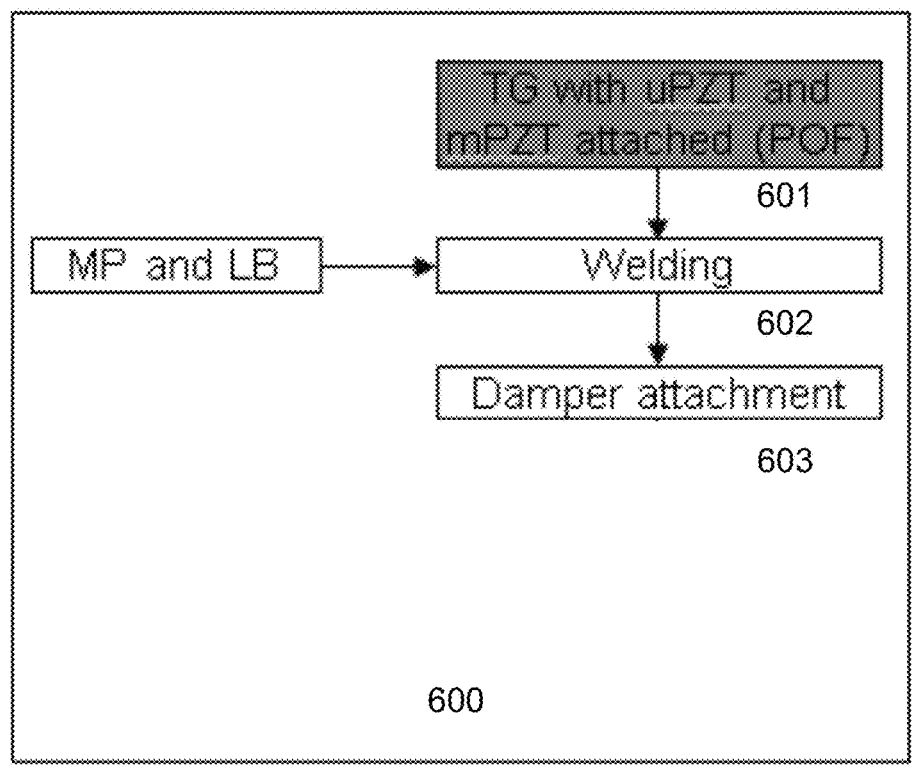
FIG. 6 is a flow chart describing a process, according to an implementation, for manufacturing the tri-stage actuation structure with the trace gimbal design of FIG. 4.

FIG. 6 is a flow chart describing process 600 for manufacturing the suspension with the trace gimbal 400 design. The process 600 is described in detail with reference to the components of a suspension including the trace gimbal 400 of FIG. 4. As an initial matter, the trace gimbal 400 is provided with the first microactuator (mPZT) and the second microactuator (uPZT) attached at step 601. The baseplate 406 and the load beam 408 are welded together at step 602. At step 603, a damping material can be attached. The damping material can include, for example, viscoelastic damping layers. The viscoelastic damping layers are inserted between the first microactuator (mPZT) and the second microactuator (uPZT) and the suspension for providing passive damping. The viscoelastic layers attached to the suspension suppress the structural resonant modes of suspension excited by the airflows and reduce the transmission of the vibrations from the carriage arm to the suspension excited by the external shocks. Other process including, but not limited to, pre-gram forming and other suspension process can follow after step 603.

As indicated herein, after the mounting, the trace gimbal is welded to the mount plate, securing the first microactuator. As a result, the attachment of the first and the second microactuators are carried out in a single process step. Furthermore, the process does not require unnecessary adhesive dispensing to secure the first microactuator to the baseplate. Adhesives create potential contamination issues within the disk drive suspension clean room assembly environment, so minimizing the use of adhesives helps to decrease manufacturing complexity and cost, and to increase the reliability of the disk drive assembly. Therefore, the manufacturing process provides a reduction in manufacturing steps and the associated costs.

Figure 7:
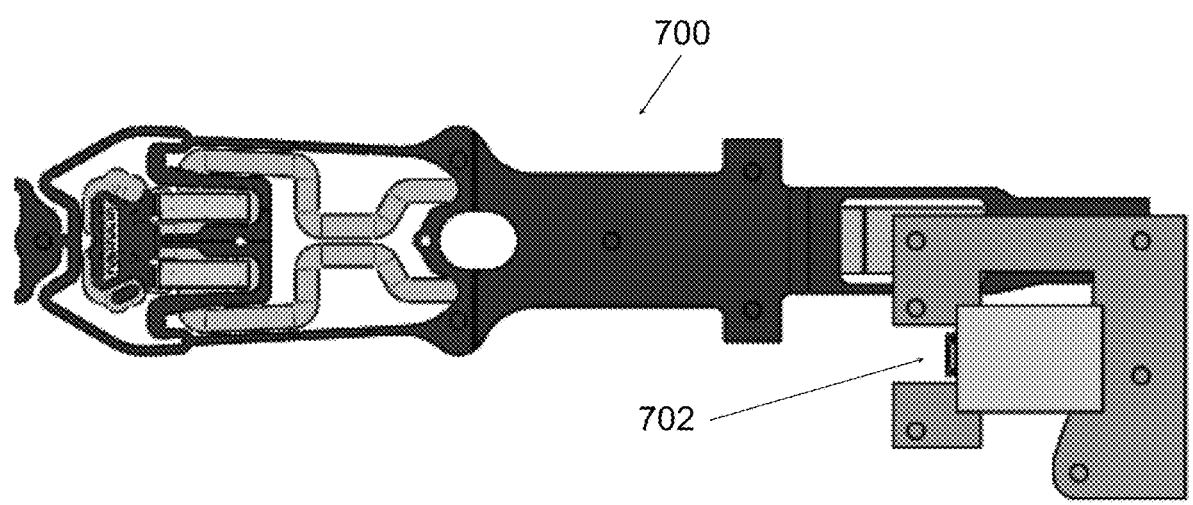
FIG. 7 illustrates an exemplary second trace gimbal design, according to an implementation.

FIG. 7 illustrates an exemplary second trace gimbal 700 design, according to an implementation. The first and the second microactuators can be directly mounted to the trace gimbal 700. As indicated above, the attachment of the first (mPZT) and second (uPZT) microactuators is carried out in one step. In comparison to the trace gimbal 400, the trace gimbal 700 includes a shelf feature 702.

Figure 8:
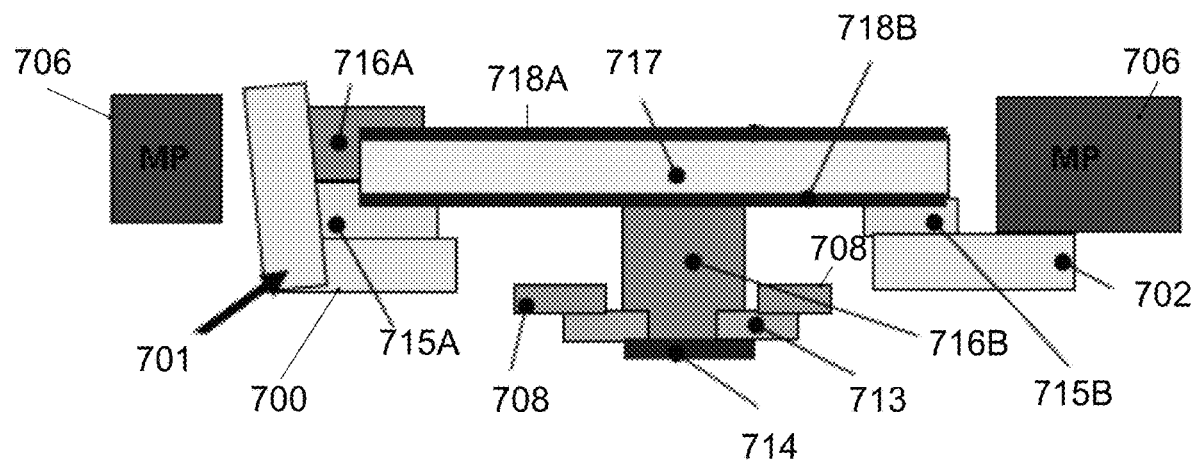
FIG. 8 illustrates a cross-sectional view of the first microactuator mounted to the second trace gimbal design of FIG. 7, according to an implementation.

FIG. 8 illustrates a cross-sectional view of a first microactuator 717 mounted to the trace gimbal 700, according to an implementation. As discussed above, the first microactuator 717 can include a proximal end and a distal end. A notable distinction between the first microactuator 417 of FIG. 5 and the first microactuator 717 of FIG. 8 is the addition of a shelf feature 702 of the trace gimbal 700. Furthermore, the second electrically conductive adhesive 716B is located between the proximal end and the distal end to connect the second electrode 718B to the trace gimbal 700.

A first non-conductive adhesive 715A can be configured to contact at least a portion of the second electrode 718B and the first microactuator 717 at the proximal end. The first non-conductive adhesive 715A serves to secure the first microactuator 717 in place with respect to the trace gimbal 700. The second electrically conductive adhesive 716B can be connected to the trace elements: copper 714 and an insulation layer 713, such as a polyimide layer.

A second non-conductive adhesive 715B can be configured to contact at least a portion of the second electrode 718B at the distal end. A shelf feature 702 of the trace gimbal 700 can be configured to connect to and support the second non-conductive adhesive 718B.

The shelf feature 702 and the fold feature 701 work together to enable an electrical connection between the first electrode 718A and the second electrode 718B of the first microactuator 717. As detailed above, the fold feature 701 can range in its position with respect to the trace gimbal 700.

Figure 9:
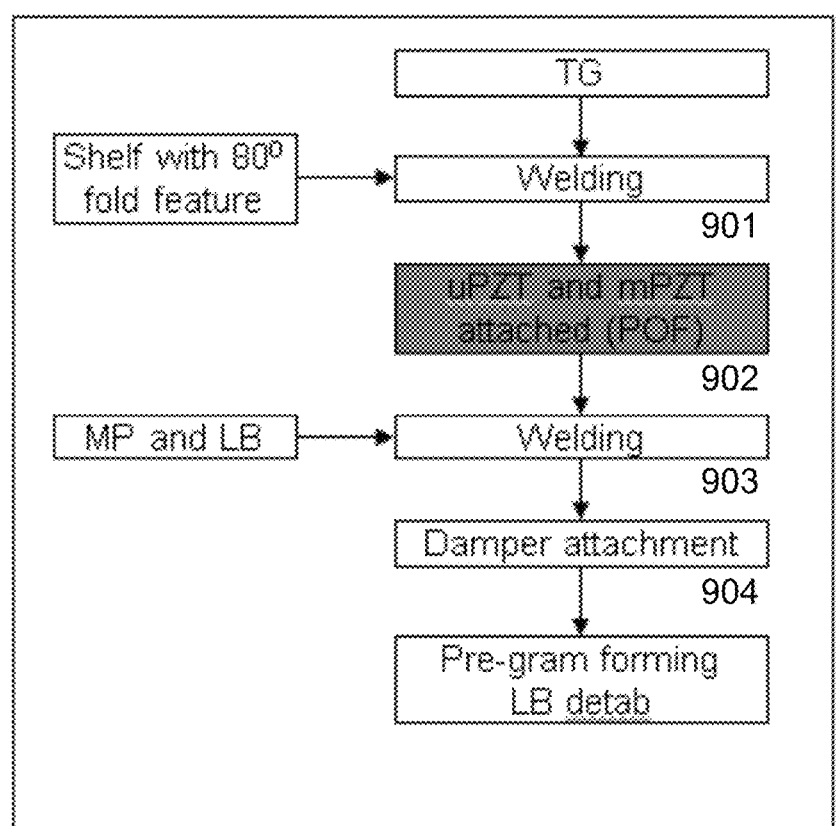
FIG. 9 is a flow chart describing a process, according to an implementation, for manufacturing the tri-stage actuation structure with the second trace gimbal design of FIG. 7.

FIG. 9 is a flow chart describing a process 900 for manufacturing the suspension with the trace gimbal 700. The process 900 is described in detail with reference to the components of a suspension including the trace gimbal 700 of FIG. 7. As an initial matter, the trace gimbal 700 is provided with the shelf feature 702 via welding at step 901. The first and the second microactuators are attached at step 902. The baseplate 706, the load beam 708 and the trace gimbal 700 are welded together at step 903. At step 904, the damping material is attached to the suspension. As aforementioned, the damping material can include, for example, viscoelastic damping layers. The viscoelastic damping layers are attached to the suspension for passive damping. The viscoelastic layers attached to the suspension suppress the structural resonant modes of suspension excited by the airflows and reduce the transmission of the vibrations from the carriage arm to the suspension excited by the external shocks.

As indicated herein, the attachment of the first and second microactuators are carried out in a single process step. As a result, the manufacturing process provides a reduction in manufacturing steps and the associated costs. Furthermore, the process of manufacturing does not include an additional adhesive dispensing after welding step, as typically found. Further suspensions according to implementations described herein have a reduced sway frequency than current suspensions. Thus, the suspensions as described herein have improved operating performance.

According to some implementations, the processes described herein are used to form one or more of any of mechanical structures and electro-mechanical structures. Although described in connection with these implementations, those of skill in the art will recognize that changes can be made in form and detail without departing from the spirit and scope of the invention.

What is claimed is:

1. A tri-stage assembly formed on a flexure comprising:
    a first microactuator located at a distal end of the flexure, the first microactuator including a proximal end and a distal end;
    a first electrode attached to a top surface of the first microactuator and a second electrode attached to a base surface of the first microactuator;
    a first electrically conductive adhesive configured to contact at least a portion of the first electrode at the proximal end to connect the first electrode to a trace gimbal; and
    a second electrically conductive adhesive configured to contact at least a portion of the second electrode to connect the second electrode to the trace gimbal,
    the trace gimbal includes a fold feature to enable an electrical connection between the first electrode, the first microactuator, and the first electrically conductive adhesive.

2. The tri-stage assembly of claim 1, further including a first non-conductive adhesive configured to contact at least a portion of the second electrode and the first microactuator at the proximal end.

3. The tri-stage assembly of claim 1, further including a second non-conductive adhesive configured to contact at least a portion of the second electrode at the distal end.

4. The tri-stage assembly of claim 3, further including a shelf feature on the trace gimbal configured to connect to the second non-conductive adhesive.

5. The tri-stage assembly of claim 4, wherein the second electrically conductive adhesive is located between the proximal end and the distal end to connect the second electrode to the trace gimbal.

6. The tri-stage assembly of claim 1, wherein the second electrically conductive adhesive is located at the distal end to connect the second electrode to the trace gimbal.

7. The tri-stage assembly of claim 1, further comprising a second microactuator located at a proximal end of the flexure, opposite of the first microactuator.

8. The tri-stage assembly of claim 7, wherein the second microactuator is located at a head portion of the trace gimbal.

9. The tri-stage assembly of claim 8, wherein the first microactuator is located opposite the head portion of the trace gimbal.

10. A method of manufacturing the tri-stage assembly of claim 1, comprising:
    attaching the first microactuator and the second microactuator to the trace gimbal to the flexure during a PZT on flexure process (POF), the first microactuator is located at a distal end of the flexure and the second microactuator located at a proximal end of the flexure; and
    welding the trace gimbal to a baseplate, and a load beam to secure the trace gimbal including the first microactuator and the second microactuator.

11. The method of claim 10, wherein the baseplate is made up of stainless steel.

12. The method of claim 10, wherein the first microactuator and the second microactuator are attached to the flexure in a transverse, shear or bending mode.

13. The method of claim 10, wherein the second microactuator is located at a gimbal head of the trace gimbal.

14. The method of claim 13, wherein the first microactuator is located opposite the gimbal head of the trace gimbal at a load beam area.

15. The method of claim 10, further comprising welding a shelf with the fold feature to the trace gimbal before attaching the first microactuator and the second microactuator to the trace gimbal.

16. The method of claim 15, wherein the fold feature is positioned at an angle between 60 degrees and 85 degrees with respect to the load beam.

17. The method of claim 16, wherein the fold feature is positioned at 80 degrees with respect to the load beam.

18. The method of claim 10, further comprising attaching damping material to provide passive damping.

* * * * *